(12) United States Patent
Toyoura

(10) Patent No.: US 12,304,488 B2
(45) Date of Patent: May 20, 2025

(54) VEHICLE CONTROL DEVICE, INFORMATION PROVISION METHOD, AND NON-TRANSITORY RECORDING MEDIUM

(71) Applicant: TOYOTA JIDOSHA KABUSHIKI KAISHA, Toyota (JP)

(72) Inventor: Takamitsu Toyoura, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 238 days.

(21) Appl. No.: 17/369,465

(22) Filed: Jul. 7, 2021

(65) Prior Publication Data
US 2022/0009495 A1 Jan. 13, 2022

(30) Foreign Application Priority Data
Jul. 13, 2020 (JP) .................. 2020-120198

(51) Int. Cl.
*B60W 30/18* (2012.01)
*B60K 35/00* (2006.01)
(Continued)

(52) U.S. Cl.
CPC ....... *B60W 30/18163* (2013.01); *B60K 35/00* (2013.01); *B60W 50/14* (2013.01); *B60W 60/0015* (2020.02); *B60W 60/0051* (2020.02); *B60K 35/10* (2024.01); *B60K 35/28* (2024.01); *B60K 2360/119* (2024.01);
(Continued)

(58) Field of Classification Search
CPC ........... B60W 30/18163; B60W 50/14; B60W 60/0015; B60W 60/0051; B60W 2050/146; B60K 35/00; B60K 2370/119; B60K 2370/175; B60K 2370/178; B60K 2370/179
See application file for complete search history.

(56) References Cited

U.S. PATENT DOCUMENTS 8,954,235 B2 * 2/2015 Lee ................. B60W 50/10 701/41
9,672,734 B1 * 6/2017 Ratnasingam ... G08G 1/096741
(Continued)

FOREIGN PATENT DOCUMENTS

| CN | 108883765 A | 11/2018 |
|---|---|---|
| CN | 108986546 A | 12/2018 |

(Continued)

*Primary Examiner* — Hongye Liang
*Assistant Examiner* — Nada Mahyoob Alqaderi
(74) *Attorney, Agent, or Firm* — Sughrue Mion, PLLC

(57) ABSTRACT

A vehicle control device includes processor being configured to: perform automated driving control for automatically performing a driving operation of the vehicle; and provide a driving event which will occur at a point ahead in the direction of advance from a current point based on a driving plan for automated driving through the information provision device to the driver. The processor is further configured to: judge the suitability of the driving operation corresponding to the driving event being performed by the driver at a point before the point of the driving event; and provide the driver with judgment information so that the driver does not perform the driving operation corresponding to the driving event at a point before the point of the driving event when judging it is not suitable to perform it.

5 Claims, 6 Drawing Sheets

(51) Int. Cl.
  *B60W 50/14* (2020.01)
  *B60W 60/00* (2020.01)
  *B60K 35/10* (2024.01)
  *B60K 35/28* (2024.01)

(52) U.S. Cl.
  CPC .. *B60K 2360/175* (2024.01); *B60K 2360/178* (2024.01); *B60K 2360/179* (2024.01); *B60W 2050/146* (2013.01)

(56) References Cited

U.S. PATENT DOCUMENTS

| | | | | |
|---|---|---|---|---|
| 2016/0259334 | A1* | 9/2016 | Hashimoto | B60W 60/0059 |
| 2017/0122767 | A1* | 5/2017 | Hetland | G01C 21/3697 |
| 2017/0326980 | A1* | 11/2017 | Masui | B60W 30/00 |
| 2018/0105185 | A1* | 4/2018 | Watanabe | B60W 50/14 |
| 2018/0154939 | A1* | 6/2018 | Aoki | B60Q 9/00 |
| 2018/0215389 | A1 | 8/2018 | Takae | |
| 2018/0222422 | A1* | 8/2018 | Takae | G06V 20/588 |
| 2019/0041652 | A1* | 2/2019 | Murayama | B60K 35/00 |
| 2019/0113914 | A1* | 4/2019 | Abe | B60W 40/04 |
| 2019/0382024 | A1* | 12/2019 | Ishioka | B60W 50/082 |
| 2020/0086890 | A1* | 3/2020 | Ikeda | G09G 5/37 |
| 2020/0307643 | A1* | 10/2020 | Ikeda | B60K 35/80 |
| 2022/0118983 | A1* | 4/2022 | Yagyu | G06V 20/588 |

FOREIGN PATENT DOCUMENTS

| | | | |
|---|---|---|---|
| JP | 2015-155857 A | 8/2015 | |
| JP | 2018-092538 A | 6/2018 | |
| JP | 2020-080028 A | 5/2020 | |
| WO | WO-2017017796 A1 * | 2/2017 | ............ B60R 21/00 |
| WO | 2017/175377 A1 | 10/2017 | |
| WO | 2018/123344 A1 | 7/2018 | |
| WO | 2018/123346 A1 | 7/2018 | |

* cited by examiner

VEHICLE CONTROL DEVICE, INFORMATION PROVISION METHOD, AND NON-TRANSITORY RECORDING MEDIUM

FIELD

The present disclosure relates to a vehicle control device, an information provision method and a nontransitory recording medium.

BACKGROUND

WO2018/123344 discloses a conventional vehicle control device configured to set a recommended lane and alternative lane based on a target route over which a host vehicle will be driven in the future and to allow the vehicle to be automatically driven on an alternative lane as is when making it be automatically driven on an alternative lane and the alternative lane changes to a recommended lane within a predetermined distance or within a predetermined time.

SUMMARY

In an automated driven vehicle, to enable a driver to learn in advance what kind of driving operation will be performed during automated driving, predetermined driving events to be performed in the future (for example, changing lanes, diverging, merging, etc.) are preferably successively shown on for example a display etc. placed at a position visible to the driver so as to notify the driver of them in advance.

Here, for example, if a driving event showing a lane change is shown on the display, there will still be time (distance) until the lane change is performed. Further, when there is a lane at the side from which the lane is to be changed (below, referred to as the "lane at the lane change side"), the driver will sometimes change lanes in advance on his or her own judgment.

However, in the road section from the current point to the point scheduled for a lane change, the lane at the lane change side may disappear due to lane reduction or the lane at the lane change side may for example become unable to be used due to construction work, an accident, etc. If ending up changing a lane in advance in such a case, it would be necessary to return to the original lane once, then again change lanes. A driving event showing a lane change is shown on a display, so a lane change performed in advance is liable to become a lane change with no purpose, i.e., a lane change disadvantageous to the driver.

In the case of the above-mentioned conventional vehicle control device, if autonomously running (being automatically driven), in a situation where an alternative lane changes to a recommended lane, there is no lane change to be made from an alternative lane to the recommended lane. However, the driver does not have the information of the alternative lane changing to the recommended lane, so the driver is still liable to change lanes in advance on his or her own judgment despite the alternative lane changing to the recommended lane.

The present disclosure was made focusing on such a problem and has as its object to enable a driver to judge whether it would be suitable to perform in advance a driving operation corresponding to a scheduled driving event to be performed in the future.

To solve the above problem, according to one aspect of the present disclosure, there is provided a vehicle control device configured to control a vehicle provided with an information provision device configured to provide information to a driver. The vehicle control device is provided with processor being configured to perform automated driving control for automatically performing a driving operation of the vehicle and provide a driving event which will occur at a point ahead in the direction of advance from a current point based on a driving plan for automated driving through the information provision device to the driver. The processor is configured to judge the suitability of the driving operation corresponding to the driving event being performed by the driver at a point before the point of the driving event and to provide the driver with judgment information so that the driver does not perform the driving operation corresponding to the driving event at a point before the point of the driving event when judging it is not suitable to perform it.

Further, according to another aspect of the present disclosure, there is provided an information provision method providing a driver through an information provision device mounted in a vehicle with a driving event which will occur at a point ahead in the direction of advance from a current point based on a driving plan prepared during automated driving where a driving operation of the vehicle is automatically performed. The information provision method is provided with a step of judging the suitability of the driving operation corresponding to the driving event being performed by the driver at a point before the point of the driving event and a step of providing the driver with judgment information so that the driver does not perform the driving operation corresponding to the driving event at a point before the point of the driving event when judging it is not suitable to perform it.

Further, according to another aspect of the present disclosure, there is provided a nontransitory recording medium provided with a computer program making a computer provide a driver through an information provision device mounted in a vehicle with a driving event which will occur at a point ahead in the direction of advance from a current point based on a driving plan prepared during automated driving where a driving operation of the vehicle is automatically performed, judge the suitability of the driving operation corresponding to the driving event being performed by the driver at a point before the point of the driving event, and provide the driver through the information provision device with judgment information so that the driver does not perform the driving operation corresponding to the driving event at a point before the point of the driving event when judging it is not suitable to perform it.

According to these aspects of the present disclosure, a driver can judge based on the judgment information whether it is suitable to perform in advance a driving operation corresponding to a scheduled driving event to be performed in the future.

DESCRIPTION OF EMBODIMENTS

Figure 1:
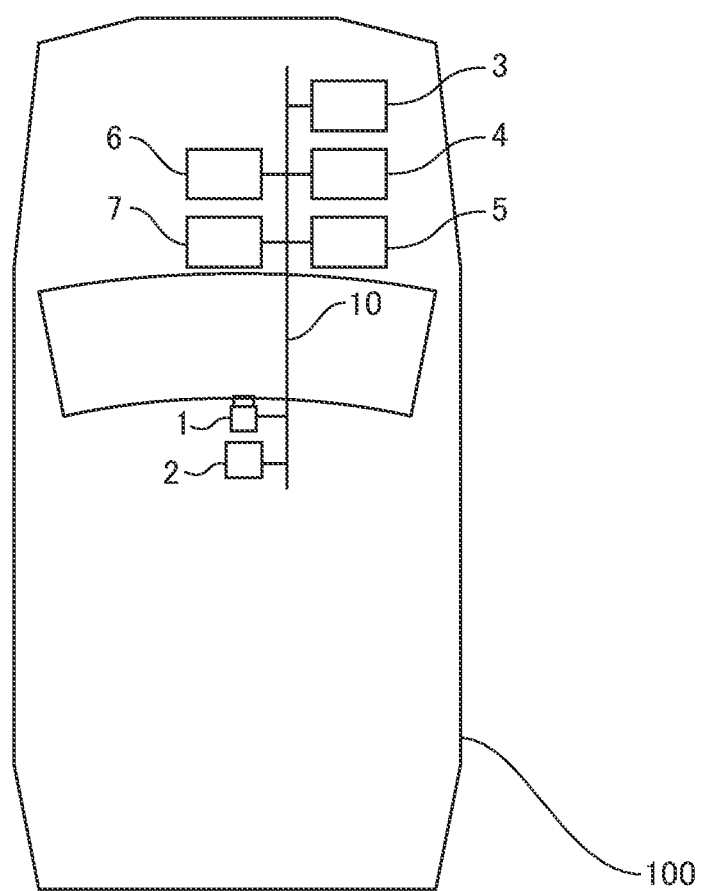
FIG. 1 is a schematic view of a system of a vehicle according to one embodiment of the present disclosure.

Below, referring to the drawings, embodiments of the present disclosure will be explained in detail. Note that, in the following explanation, similar component elements will be assigned the same reference notations.

FIG. 1 is a schematic view of the system of the vehicle 100 according to one embodiment of the present disclosure in which automated driving is possible.

The vehicle 100 is provided with a camera 1, distance measuring sensor 2, object recognition device 3, outside information receiving device 4, map database 5, information provision device 6, and vehicle control device 7. The camera 1, distance measuring sensor 2, object recognition device 3, outside information receiving device 4, map database 5, information provision device 6, and vehicle control device 7 are connected to be able to communicate with each other through an internal vehicle network 10 based on the standard called the Controller Area Network.

The camera 1 is for example attached to the inside of a compartment of the vehicle 100 so as to face the area ahead of the vehicle 100 and captures the area ahead of the vehicle 100 by a predetermined frame rate (for example, 10 Hz to 40 Hz) to generate images showing the area ahead (below, referred to as the "camera images"). Further, each time generating a camera image, the camera 1 transmits the generated camera image through the internal vehicle network 10 to the vehicle control device 7.

Figure 2:
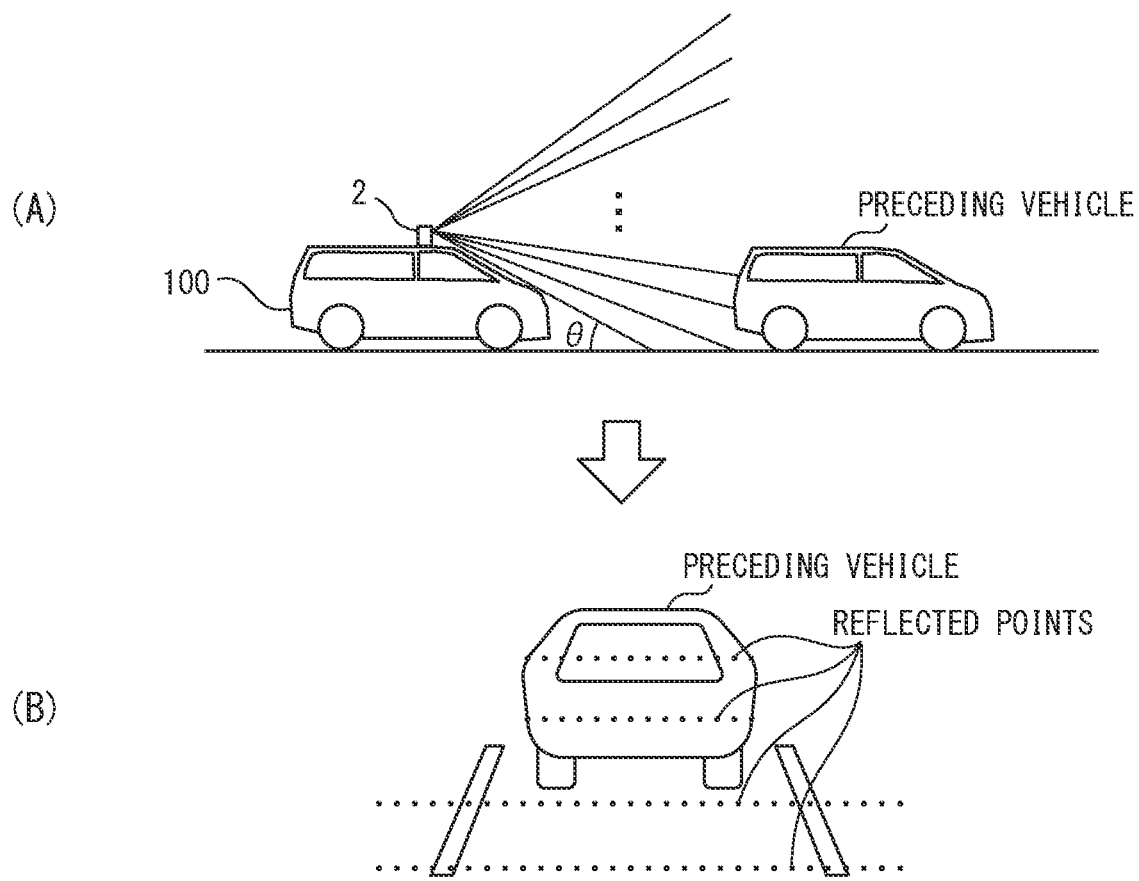
FIG. 2 is a view explaining operation of a distance measuring sensor.

The distance measuring sensor 2 emits a plurality of laser beams or radio waves different in angles of emission as shown in FIG. 2(A) horizontally and in parallel to measurement regions around the vehicle 100 and receives reflected beams of the emitted laser beams or reflected waves of the emitted radio waves. Further, based on the received reflected beams or reflected waves, the distance measuring sensor 2 measures the distances to the roads or obstacles present in the measurement regions (for example, buildings, preceding vehicles or following vehicles on the road, oncoming vehicles, and other such driven vehicles, stopped vehicles, curbs, fallen objects, pedestrians, etc.) The distance to the road or obstacle, as shown FIG. 2(B), is acquired for each reflected point (emission point) of the laser beams or radio waves. The distance measuring sensor 2 links the distances to the reflected points and the coordinate information of the reflected points and sends them as distance measurement data through the internal vehicle network 10 to the object recognition device 3.

As the distance measuring sensor 2 emitting the laser beams, for example, a LIDAR (light detection and ranging device) may be mentioned. Further, as a distance measuring sensor 2 emitting radio waves, for example, a milliwave laser sensor may be mentioned. In the present embodiment, as shown in FIG. 2(A), as the distance measuring sensor 2, a LIDAR attached to the roof of the vehicle 100 may be used.

The object recognition device 3 recognizes the other vehicles present around the vehicle 100 based on the distance measurement data. Specifically, the object recognition device 3 groups reflected points satisfying predetermined conditions among the plurality of reflected points detected based on the reflected waves of the emitted laser beams as reflected points of the laser beams etc. reflected from the same objects to thereby recognize other vehicles present around the vehicle 100. Further, the object recognition device 3 transmits information relating to the other recognized vehicles (below, referred to as the "other vehicle information") through the internal vehicle network 10 to the vehicle control device 7.

The outside information receiving device 4, for example, receives congestion information or weather information, road work information, accident information, and other outside information sent from a road traffic information communication system center or other outside communication center. The outside information receiving device 4 sends the received outside information through the internal vehicle network 10 to the vehicle control device 7.

The map database 5 is a database relating to map information. This map database 5 is stored in, for example, a hard disk drive (HDD) mounted in the vehicle. The map information includes position information of the road, information on the road shape (for example, curved or straight, curvature of curves, etc.), position information of intersections and diverging points, road types, and other information.

The information provision device 6 is a device for providing various information to the driver and is provided with a display arranged at a position visible to the driver for displaying text information or image information or a speaker etc.

The vehicle control device 7 receives not only the above-mentioned camera images or other vehicle information, outside information, etc., various information required for automated driving for automatically performing driving operations relating to acceleration, steering, and braking (for example, current position information or vehicle speed information of the vehicle 100, driver information, etc.)

The vehicle control device 7 is provided with a automated driving control part 731 (see FIG. 5) for preparing a driving plan for automated driving based on these information and map information acquired from the map database 5 etc. and for automatically performing driving operations relating to acceleration, steering, and braking according to the driving plan. The driving plan for the automated driving sets the driving route during automated driving, the driving events to be successively performed during automated driving (for example, lane changes, diverging, merging, etc.) etc.

Figure 3:
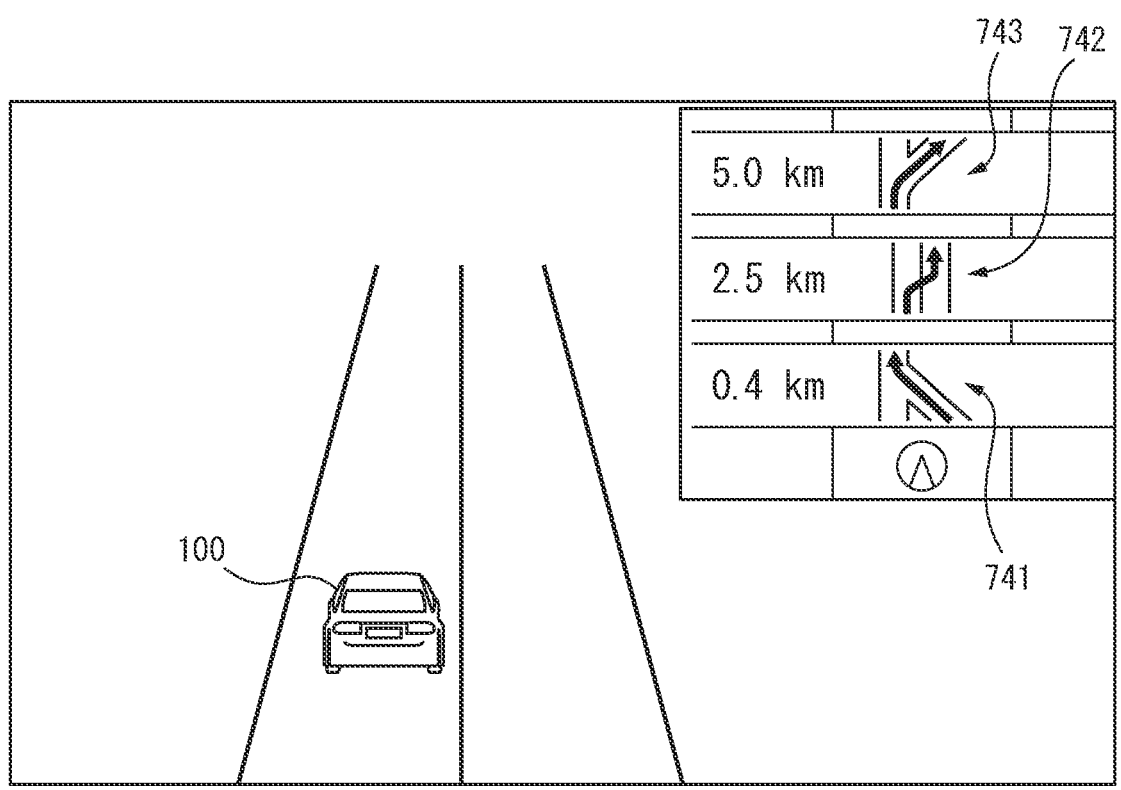
FIG. 3 is a view showing an example of display of a driving event.
Figure 5:
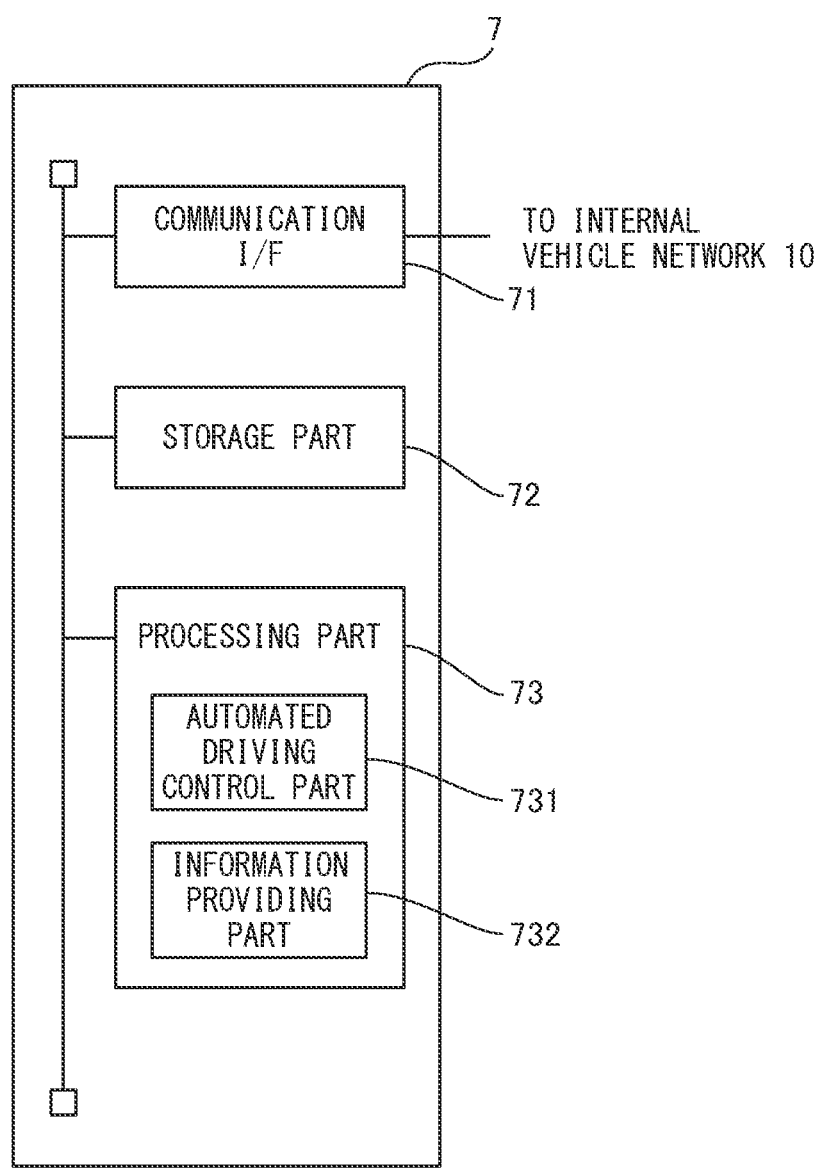
FIG. 5 is a view showing a hardware configuration of a vehicle control device.

Further, the vehicle control device 7 is provided with an information providing part 732 for providing driving events to be successively performed during automated driving through the information provision device 6 to the driver (see FIG. 5). The information providing part 732 according to the present embodiment, as shown in FIG. 3, is configured to show on the display, in the order of performance from the bottom, driving events which will occur at points ahead in the direction of advance together with the vehicle icon showing the host vehicle 100. In the example shown in FIG. 3, specialized icons 741 to 743 corresponding to three nearest driving events are displayed together with distance information from the current position to the positions where the drive events are scheduled to be performed. In FIG. 3, the lowest specialized icon 741 is an icon showing merging. The specialized icon 742 in the middle is an icon showing a lane change. The topmost specialized icon 743 is an icon showing divergence.

By providing information relating to driving events scheduled to be performed in the future to a driver in this way, the driver can obtain a grasp in advance of what kind of driving operations will be performed during automated driving. As a result, when a specialized icon 742 showing a lane change is shown on the display as a driving event scheduled to be performed in the future, there is still time (distance) until the lane change is performed. Further, when there is a lane at the side from which the lane is to be changed (the lane at the lane change side), it is possible that the driver will change lanes in advance on his or her own judgment.

However, in the road section from the current point to the point scheduled for a lane change, the lane at the lane change side may disappear due to lane reduction or the lane at the lane change side may for example become unable to be used due to construction work, an accident, etc. If ending up changing a lane in advance in such a case, it would be necessary to return to the original lane once, then again change lanes. A specialized icon 742 showing a lane change is shown on a display, so a lane change performed in advance is liable to become a lane change with no purpose, i.e., a lane change disadvantageous to the driver.

Therefore, in the present embodiment, judgment information for enabling a driver to judge whether performing in advance a driving operation corresponding to a driving event scheduled to be performed in the future is provided to the driver.

Figure 4:
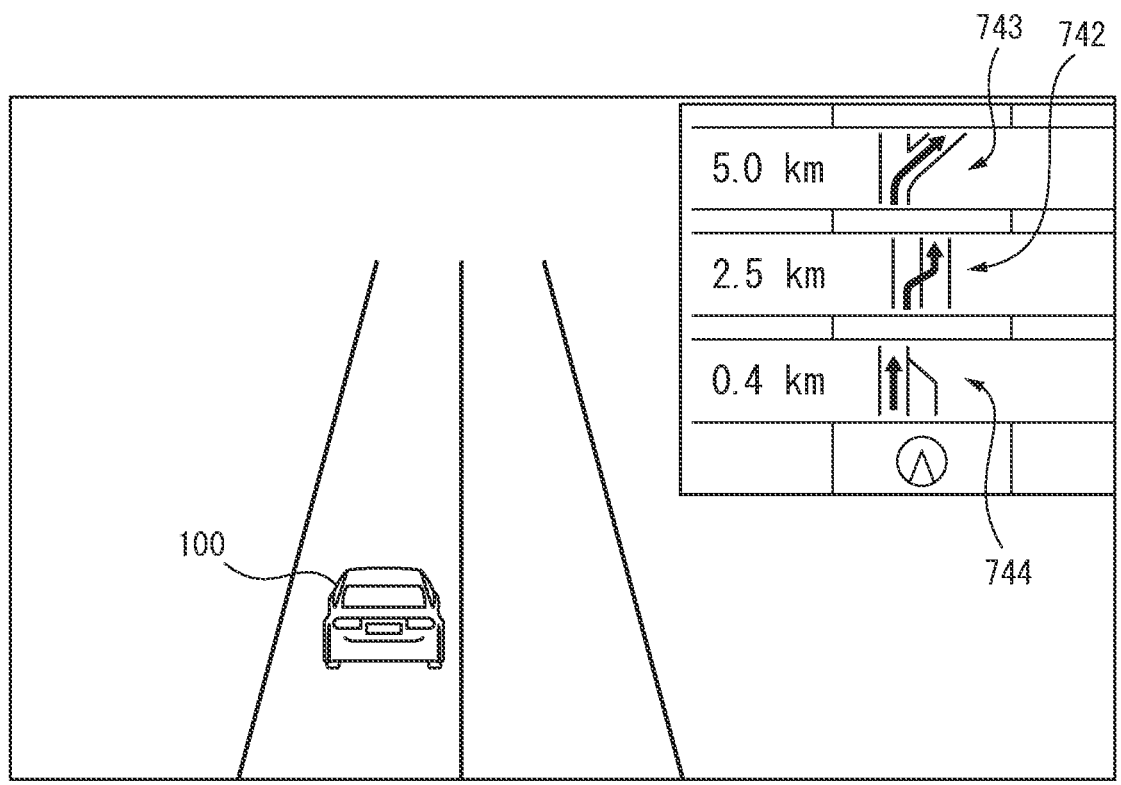
FIG. 4 is a view showing one aspect of an example of display of a driving event in the case including lane change inhibiting information as judgment information.

Specifically, in the present embodiment, in the road section from the current point to the point scheduled for a lane change, when the lane at the lane change side may disappear due to lane reduction or the lane at the lane change side may for example become unable to be used due to construction work, an accident, etc., for example, as shown in FIG. 4, a specialized icon 744 showing that changing a lane in that road section would not be suitable (lane change inhibiting information) is displayed as judgment information before the driving event of the lane change (below specialized icon 742 showing lane change). Note that in FIG. 4, the specialized icon 744 showing that making that lane change would not be suitable is shaped showing that the lane at the lane change side is disappearing, but is not limited to such a shape.

FIG. 5 is a view showing a hardware configuration of a vehicle control device 7.

As shown in FIG. 5, the vehicle control device 7 is provided with a communication interface 71, storage part 72, and processing part 73.

The communication interface 71 is provided with an interface circuit for connecting the vehicle control device 7 to the internal vehicle network 10. That is, the communication interface 71 is connected through the internal vehicle network 10 to the information provision device 6 etc.

The storage part 72 has an HDD (hard disk drive) or optical recording medium, semiconductor memory, or other storage media and stores various computer programs, data, etc. used for processing at the processing part 73.

The processing part 73 has one or more processors and their peripheral circuits. The processing part 73 performs various computer programs stored in the storage part 72 and comprehensively controls the overall operations of the vehicle control device 7 and is for example a CPU (central processing unit). The processing part 73 performs processing in accordance with computer programs to function as the above-mentioned automated driving control part 731 and information providing part 732 and operate as a functional part realizing a predetermined function (module). The information providing part 732 performs information provision processing for providing driving events scheduled to be performed in the future based on a driving plan for automated driving through the information provision device 6 to the driver.

Figure 6:
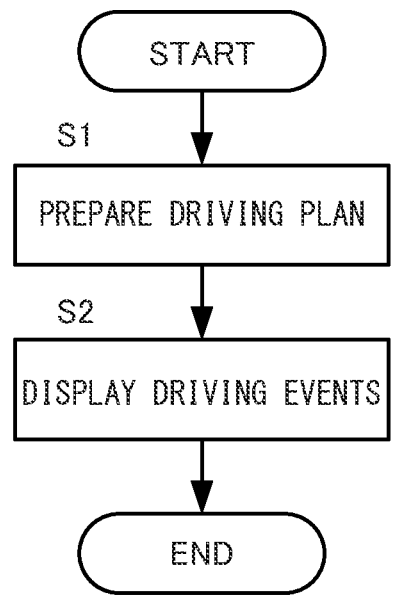
FIG. 6 is a flow chart explaining details of information provision processing according to one embodiment of the present disclosure.

FIG. 6 is a flow chart explaining details of information provision processing according to this embodiment.

At step S1, the vehicle control device 7, as explained above, extracts various driving events on the driving route and prepares a driving plan for automated driving based on the camera images or other vehicle information, outside information, map information, and various other information.

At step S2, the vehicle control device 7 successively shows on a display in the order of performance various specialized icons corresponding to driving events to be performed during automated driving based on the driving plan for automated driving. At this time, in the present embodiment, it is judged based on the above-mentioned information whether, in a road section before the point scheduled for performing a lane change, there is a road section where the lane at the lane change side will disappear due to lane reduction or a road section where the lane at the lane change side can no longer be used due to for example construction or an accident etc. Further, if there is such a road section, as shown in FIG. 4, a specialized icon 744 showing that changing a lane in that road section would not be suitable is shown on the display before a driving event of a lane change.

According to the present embodiment explained above, the vehicle control device 7 controlling a vehicle 100 provided with an information provision device 6 for providing a driver with information is provided with a automated driving control part 731 performing automated driving automatically performing driving operations of the vehicle and an information providing part 732 providing the driver through an information provision device 6 with driving events which will occur at points ahead in the direction of advance from the current point based on the driving plan for automated driving.

The information providing part 732 is configured to judge whether it would be suitable for a driving operation corresponding to a driving event to be performed by a driver at a point before the point of the driving event and, when judging that it would not be suitable, to provide the driver with judgment information so that driver does not perform a driving operation corresponding to a driving event at a point before the point of the driving event.

Due to this, the driver can judge whether it would be suitable to perform in advance a driving operation corresponding to a driving event scheduled to be performed in the future, so it is possible to keep a driving operation from being performed for no purpose.

Specifically, the driving operation corresponding to the driving event is a lane change, and the information providing part 732 is configured to provide to the driver a specialized icon 744 showing whether a lane to be changed to will disappear due to a lane reduction or will become unable to be driven on at a point before the point of the driving event, that is, lane change inhibiting information, as the judgment information. Due to this, it is possible to keep the driver from ending up changing a lane for no purpose.

Further, in the present embodiment, the information providing part 732 is further configured to provide the driver with distance information from the current point to the point where the lane to be changed to will disappear due to a lane reduction or will become unable to be driven together with the lane change inhibiting information. By providing the driver with distance information together with the lane change inhibiting information in this way, the driver can accurately grasp a road section not suitable to a lane change.

Figure 7:
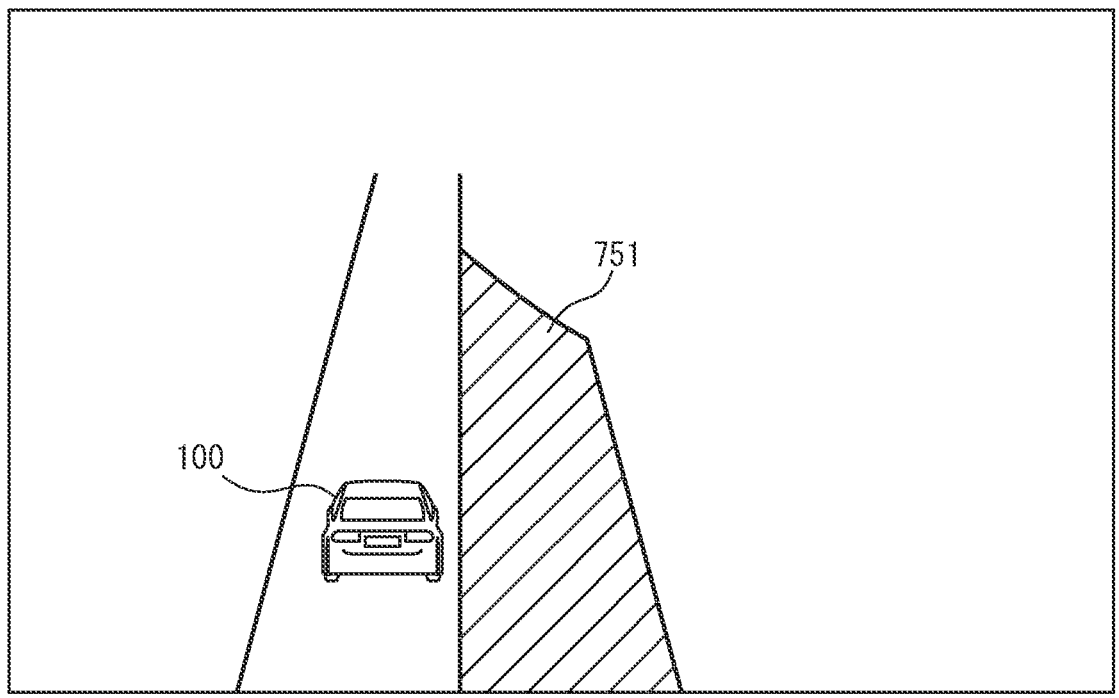
FIG. 7 is a view showing another aspect of an example of display of a driving event in the case including lane change inhibiting information as judgment information.

Note that, in the present embodiment, the information providing part 732 is configured to show on a display (information display screen) visible to the driver, as the lane change inhibiting information, a specialized icon 744 showing that the lane to be changed to will disappear due to a lane reduction or will become unable to be driven on. However, for example, as shown in FIG. 7, it is also possible to explicitly show on a display (information display screen) visible to the driver, as the lane change inhibiting information, the lane 751 to be changed to which will disappear due to a lane reduction or will become unable to be driven on at a point before the point of occurrence of the driving event.

Note that, if viewing the present embodiment from another viewpoint, the processing performed in the processing part 73 of the vehicle control device 7 according to the present embodiment can be said to be an information provision method providing a driver through an information provision device 6 mounted in a vehicle 100 with a driving event which will occur at a point ahead in the direction of advance from a current point based on a driving plan prepared during automated driving where a driving operation of the vehicle 100 is automatically performed, the information provision method provided with a step of judging the suitability of the driving operation corresponding to the driving event being performed by the driver at a point before the point of the driving event and a step of providing the driver with judgment information so that the driver does not perform the driving operation corresponding to the driving event at a point before the point of the driving event when judging it is not suitable to perform it.

Further, the computer program performed in the processing part 73 of the vehicle control device 7 according to the present disclosure can be said to be a computer program making a computer provide a driver through an information provision device 6 mounted in a vehicle 100 with a driving event which will occur at a point ahead in the direction of advance from a current point based on a driving plan prepared during automated driving where a driving operation of the vehicle 100 is automatically performed, judge the suitability of the driving operation corresponding to the driving event being performed by the driver at a point before the point of the driving event, and provide the driver through the information provision device 6 with judgment information so that the driver does not perform the driving operation corresponding to the driving event at a point before the point of the driving event when judging it is not suitable to perform it.

Above, embodiments of the present disclosure were explained, but the embodiments only show some of the examples of application of the present disclosure. They are not meant to limit the technical scope of the present disclosure to the specific configurations of the embodiments.

For example, in the above embodiments, judgment information for preventing a driver from performing a driving operation corresponding to a driving event at a point before the point of the driving event is provided to the driver by showing it on a display, but together with showing it on a display or instead of showing it on a display, for example voice may be used to notify the driver.

The invention claimed is:

1. A vehicle control device configured to control a vehicle, comprising:
    an information provision device configured to provide information to a driver of the vehicle;
    a processor, during automated driving control of the vehicle, configured to:
        perform the automated driving control by automatically performing a driving operation of the vehicle relating to an automated driving plan of the vehicle control device, the automated driving control comprising operations relating to at least one of acceleration, steering, and braking, according to the automated driving plan;
        provide, through the information provision device to the driver, a driving event that is to occur at a subsequent point ahead in a direction of advance from a current point, based on the automated driving plan;
        judge whether a driver driving operation being performed by the driver at the current point before the subsequent point of the driving event is acceptable to be performed, the driving event being a lane change to a first lane at a first side of the vehicle, the driver driving operation being a lane change to a second lane at the first side of the vehicle performed at the current point before the subsequent point of the driving event, the judging being based on whether the second lane is unable to be driven on between the current point and the subsequent point of the driving event due to at least one of a blockage or an ending of the second lane;
        provide, through the information provision device to the driver, judgment information that causes the driver not to perform the driver driving operation, based on the judging that the driver driving operation is unacceptable according to the automated driving plan being executed by the vehicle control device, the judgment information comprising lane change inhibiting information indicating that the second lane is unable to be driven on between the current point and the subsequent point of the driving event due to the at least one of the blockage or the ending of the second lane; and
        provide, through the information provision device to the driver together with the judgment information, distance information from the current point to a point where the second lane is unable to be driven due to the at least one of the blockage or the ending of the second lane.

2. The vehicle control device according to claim 1, wherein the processor is further configured to:
    display, on an information display screen visible to the driver, as the lane change inhibiting information, a specialized icon showing that the second lane is unable to be driven due to the at least one of the blockage or the ending of the second lane before the subsequent point of the driving event.

3. The vehicle control device according to claim 1, wherein the processor is further configured to:
    display, on an information display screen visible to the driver, as the lane change inhibiting information, the second lane that is unable to be driven due to the at least one of the blockage or the ending of the second lane before the subsequent point of the driving event.

4. An information provision method for controlling a vehicle, the information provision method comprising:
    performing automated driving control of the vehicle by automatically performing a driving operation of the vehicle relating to a driving plan of the vehicle, the automated driving control comprising operations relating to at least one of acceleration, steering, and braking, according to the driving plan;

providing a driver, through an information provision device mounted in the vehicle, with a driving event that is to occur at a subsequent point ahead in a direction of advance from a current point, based on the driving plan of the vehicle prepared during the automated driving control;

judging whether a driver driving operation being performed by the driver at the current point before the subsequent point of the driving event is acceptable to be performed, the driving event being a lane change to a first lane at a first side of the vehicle, the driver driving operation being a lane change to a second lane at the first side of the vehicle performed at the current point before the subsequent point of the driving event, the judging being based on whether the second lane is unable to be driven on between the current point and the subsequent point of the driving event due to at least one of a blockage or an ending of the second lane;

providing, through the information provision device to the driver, judgment information that causes the driver not to perform the driver driving operation, based on the judging that the driver driving operation is unacceptable according to the driving plan being performed, the judgment information comprising lane change inhibiting information indicating that the second lane is unable to be driven on between the current point and the subsequent point of the driving event due to the at least one of the blockage or the ending of the second lane; and providing, through the information provision device to the driver together with the judgment information, distance information from the current point to a point where the second lane is unable to be driven due to the at least one of the blockage or the ending of the second lane.

5. A non-transitory computer-readable recording medium storing a computer-executable program that, when executed by at least one processor of a vehicle control device, cause the vehicle control device to:

perform automated driving control of a vehicle by automatically performing a driving operation of the vehicle relating to a driving plan of the vehicle control device, the automated driving control comprising operations relating to at least one of acceleration, steering, and braking, according to the driving plan;

provide a driver, through an information provision device mounted in the vehicle, with a driving event that is to occur at a subsequent point ahead in a direction of advance from a current point based on the driving plan prepared during the automated driving control of the vehicle;

judge whether a driver driving operation being performed by the driver at the current point before the subsequent point of the driving event is acceptable to be performed, the driving event being a lane change to a first lane at a first side of the vehicle, the driver driving operation being a lane change to a second lane at the first side of the vehicle performed at the current point before the subsequent point of the driving event, the judging being based on whether the second lane is unable to be driven on between the current point and the subsequent point of the driving event due to at least one of a blockage or an ending of the second lane;

provide, through the information provision device to the driver, judgment information that causes the driver not to perform the driver driving operation, based on the judging that the driver driving operation is unacceptable according to the driving plan being performed, the judgment information comprising lane change inhibiting information indicating that the second lane is unable to be driven on between the current point and the subsequent point of the driving event due to the at least one of the blockage or the ending of the second lane; and provide, through the information provision device to the driver together with the judgment information, distance information from the current point to a point where the second lane is unable to be driven due to the at least one of the blockage or the ending of the second lane.

* * * * *